April 29, 1969  J. H. VAN RIET ET AL  3,440,990

CARGO SHIP CONSTRUCTION

Filed Dec. 22, 1967  Sheet 1 of 7

Fig. 1

Inventors:
JOSEF H. VAN RIET
WILFRIED STUMMER
FRITZ SANDMANN
CONSTANTIN GALLIN

BY

Kenyon & Kenyon
ATTORNEYS

April 29, 1969  J. H. VAN RIET ET AL  3,440,990
CARGO SHIP CONSTRUCTION

Filed Dec. 22, 1967  Sheet 2 of 7

Inventors:
JOSEF H. VAN RIET
WILFRIED STUMMER
FRITZ SANDMANN
CONSTATIN GALLIN

BY
Kenyon & Kenyon
ATTORNEYS

United States Patent Office 3,440,990
Patented Apr. 29, 1969

3,440,990
CARGO SHIP CONSTRUCTION
Josef H. van Riet, Hamburg, Wilfried Stummer, Hamburg-Blankenese, and Fritz Sandmann and Constantin Gallin, Hamburg, Germany, assignors to Blohm & Voss A.G., Hamburg, Germany, a company of Germany
Filed Dec. 22, 1967, Ser. No. 692,771
Claims priority, application Germany, Feb. 4, 1967, B 91,049
Int. Cl. B63b 25/04, 3/08, 25/22
U.S. Cl. 114—72    10 Claims

ABSTRACT OF THE DISCLOSURE

An improved cargo ship construction useful as required as a carrier for selected types of general, bulk and container cargoes, the ship being an assembly of a plurality of joined, selected, interchangeable prefabricated moduli each capable of carrying selected types of said cargoes, the prefabricated ship's moduli being formed respectively of like types of hollow modular construction units disposed in selected arrangements in the prefabricated individual moduli particularly to form the ship's bottom and top deck region, hull plating being used in the moduli and joined to various of the hollow modular construction units.

BRIEF SUMMARY OF THE INVENTION

The invention relates to a motor vessel, especially a cargo vessel which can be arranged as a carrier for general cargo or as a bulk cargo carrier or container cargo as required and can be produced by a sectional or unit construction.

The production of a ship's hull from prefabricated moduli attached one to the other on a unit principle leads as is known to a substantial reduction in prime costs. This preferred method of construction nevertheless has disadvantages which lie in the fact that a plurality of specially produced jigs or patterns is necessary for each of the different prefabricated moduli which are of various sizes and constructions whereby the expense is substantially increased. Furthermore, the variety of the different required prefabricated moduli involves a comparatively high stock inventory quite apart from the multiplicity of constructions, preparation work and procurement of materials which is necessary as well as the wide range of auxiliary materials which are required.

The invention is directed to the problem of substantially reducing the time necessary for the production of a ship's hull without it being necessary to depart from the proved sectional construction. This object is obtained according to the invention by the fact that the prefabricated moduli are interchangeable one with the other and utilize similar modular construction units in selected arrangements in their fabrication.

The invention begins with the recognition that standardization of the moduli which are to be assembled together on the unit principle provides the best approach to a rational method of construction. Thus, in the first place, the basic feature is incorporated so that the ship's structure consists of the fewest possible number or range of such parts which differ from one another as regards their dimensions and properties. This result is obtained according to a further feature of the invention by the fact that the prefabricated moduli which are to be joined together on the unit assembly principle comprise a forward modulus, an aft modulus as well as a mid-ship modulus and intermediate moduli.

The objects to which the invention is directed can be attained with particular advantage if the ship's hull or the outer skin receives a shape which is produced, according to an earlier proposal, exclusively from plain triangular or polygonal surfaces which are arranged at a definite angle one to the other. In this way, the production of a ship's hull is possible without special skill or special equipment being required and whereby the otherwise necessary shaping of the hull plating is almost completely avoided and, moreover, the considerable advantage is secured that automatic welding equipment can be employed.

A particularly desirable feature of the invention consits in the fact that the top deck and the ship's bottom in each prefabricated modulus are formed by similar modular construction units in the form of hollow bodies. Those of the essentially rectangular modular construction components or units forming part of the outer plating which are to be used in the manner still to be described for the individual sections are provided on the side facing the hull plating with a bevelled part, providing not only a further simplification in the construction of the ship structure but permitting also the arrangement of a particularly advantageous hatch system and simultaneously increasing the load capacity of the hull and its stabilization and seagoing behavior.

Thus, it is, for example, possible for the modular construction units which are fully congruent as regards their dimensions, in each modulus to be arranged as regards the different moduli, namely, the mid-ship modulus and the intermediate moduli arranged on both sides thereof, so that conversion of the ship's hull to a different type of ship, for example, the so-called dry cargo vessel to the so-called bulk carrier or from a dry cargo vessel to an open ship, can be readily carried out with minimum expenditure.

According to a further feature of the invention, provision is therefore made in an embodiment that the modular construction units in the ship's bottom are arranged with their wider sides running horizontally while the modular construction units in the region of the top deck are arranged with their two wider sides extending vertically. Finally, in another embodiment, additionally two centrally arranged modular construction units are provided running in the longitudinal direction of the top deck or in a still further embodiment for further increasing the cargo space for special products such as containers, provision is made that two mutually connected modular construction units are provided in the region of the top deck or the hull plating.

As already stated above, the modular construction units permit a particularly convenient arrangement fo formation of the hatch system. Thus provision is mad that the modular construction units arranged in the re gion of the top deck form lengthwise of the ship th lateral borders of one or two hatch openings which ex tend over practically the whole length of the top deck an wherein the hatch openings are adapted to be covered i known manner by liftable hatch covers or hatch cover mounted on rollers which are arranged in a horizont plane common with the top deck. In this way, the to deck is made available as completley as possible for dec loading if this facility is called for.

Other objects and features of the invention will b come apparent from the following detailed descriptic and the accompanying drawings forming a part herec wherein, by way of example.

DETAILED DESCRIPTION

Figure 1:
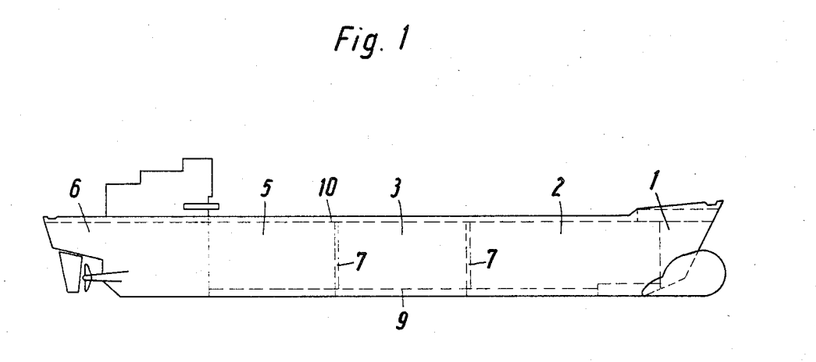
FIGURE 1 is a side view of a motor vessel or car ship embodying the invention.
Figure 2:
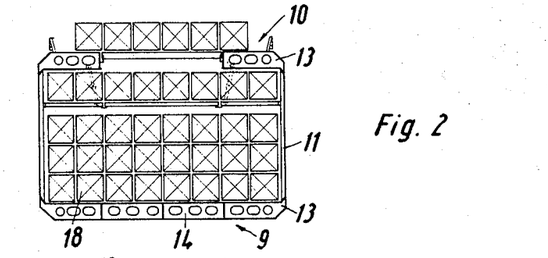
FIGURE 2 shows an end view and loading plan for example, a mid-ship modulus utilizing the modul construction units of the invention for carrying contair cargo in the ship's hold and on its deck.

Referring now to the drawings:

As shown in FIGURE 1, a motor vessel embodying the invention may consist of five prefabricated moduli or moduli groups which are joined together on the unit principle, for example, by welding together on a slipway. These moduli respectively are a fore modulus 1, a first intermediate modulus 2, a mid-ship modulus 3 and a second intermediate modulus 5, the two intermediate moduli being similar and finally the aft section 6. The cargo loading equipment, such as derricks are provided but are not shown on the drawings. Double bulkheads 7 are provided between the mid-ship modulus 3 and the intermediate moduli 2 and 5 which serve as borders for the carrying space hatches still to be described.

In FIGS. 2 to 9 various end views of the mid-ship modulus 3 or of the intermediate moduli 2 or 5 are shown, wherein the structural arrangement of the constructional units forming the ship's body and the loading plan possibilities are indicated schematically.

Figure 9:
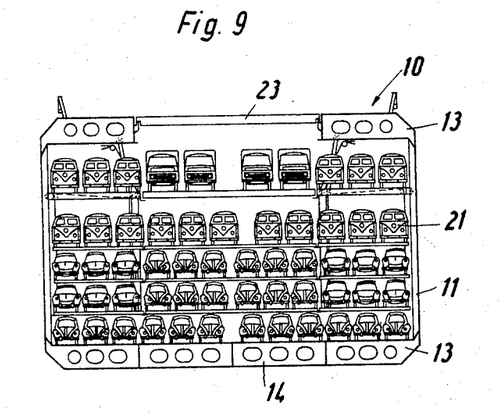
FIGURE 9 shows an end view and loading plan like that of FIGURE 2 for automobile cargo in the ship's hold.
Figure 10:
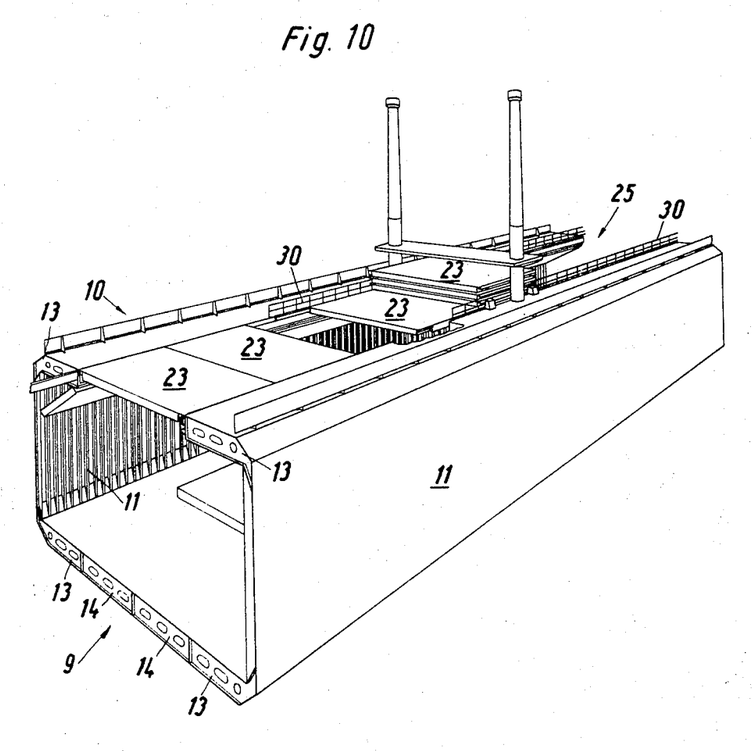
FIGURE 10 is a perspective view of a prefabricated midship modulus embodying the invention.
Figure 11:
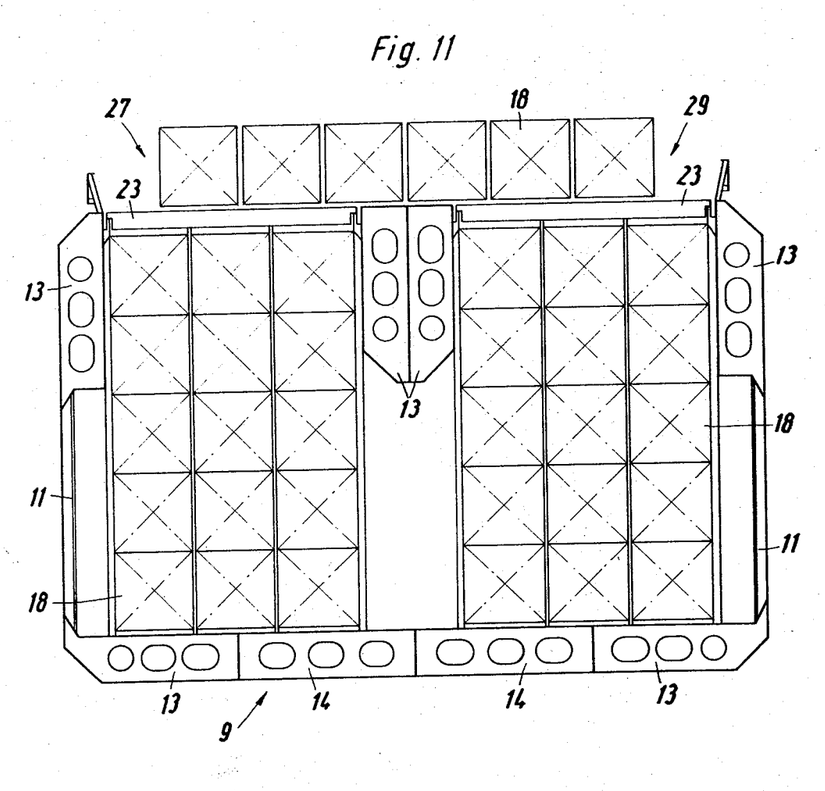
FIGURE 11 is a view like that of FIGURE 5 on an enlarged scale.
Figure 12:
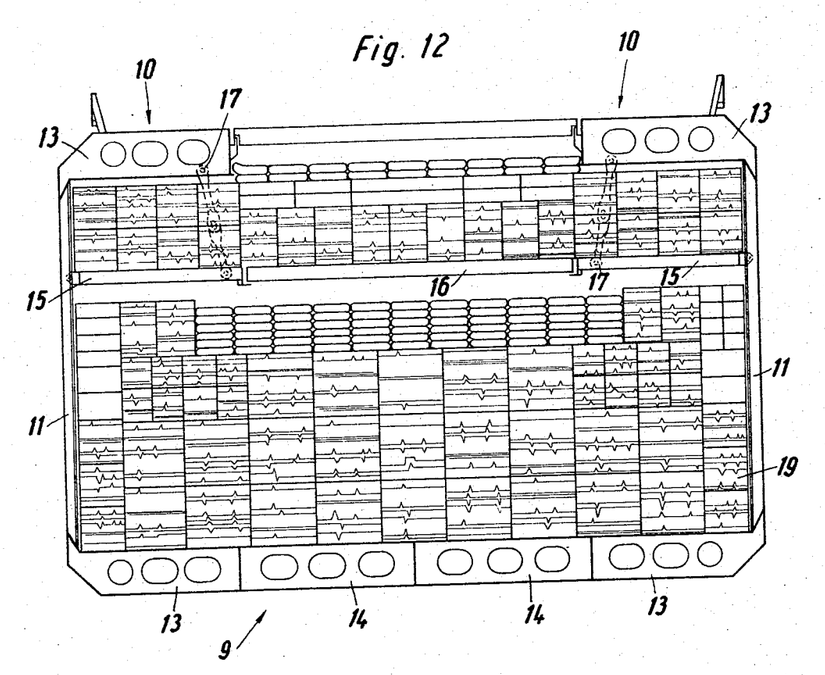
FIGURE 12 is a view like that of FIGURE 1 on an enlarged scale.

Essentially, the interchangeable moduli, namely, the mid-ship modulus 3 and the intermediate moduli 2 and 5 respectively, comprise a double bottom 9 and a top deck 10 as well as the hull side walls or panels 11 (FIGS. 10, 11 and 12). Both the double bottom 9 and also the top deck 10 are preferably formed of hollow bodies being produced from assemblies of approximately rectangular hollow modular constructional units 12 (FIG. 8a) and 13 and 14 or of 13 and 14 only, FIGS. 2-12 inclusive. The parallel mid-ship portion, assembled from joined prefabricated midship and intermediate moduli, which has the greatest possible length, thus consists of prefabricated assemblies of hollow modular construction units which form the double bottom 9 and the top deck 10. It will be seen from FIGURES 8a and 2-12 that the hollow modular construction units 12 have substantially square rectangular shape, while hollow modular construction units 14 have substantially oblong, rectangular shape. The hollow modular construction units 13 likewise have substantially oblong, rectangular shape, but on one of their narrow sides have a bevelled portion.

Figure 3:
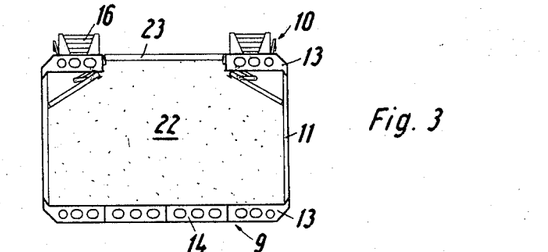
FIGURE 3 shows a similar view and loading plan for bulk cargo only.
Figure 4:
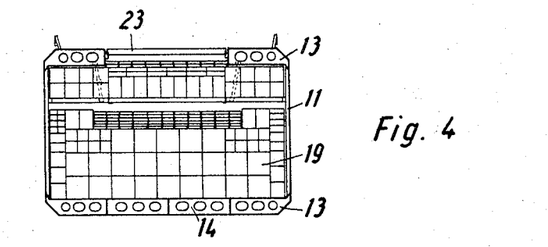
FIGURE 4 shows a similar view and loading plan for general cargo.
Figure 5:
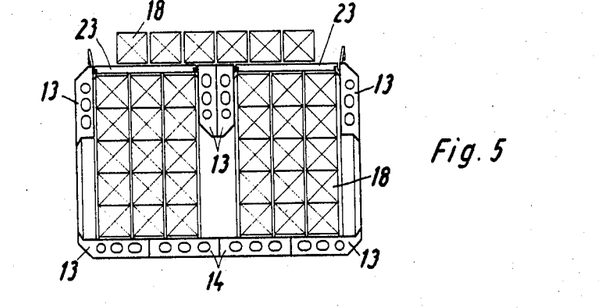
FIGURE 5 shows a similar view and loading plan for container cargo utilizing additional modular construction units to provide double hatch openings in the ship's top deck.

Thus, as will be seen from FIGS. 2 to 12, the hollow modular construction units 13 which have on their narrow sides a bevelled portion, not further shown, permits satisfactory hydrodynamic properties where the bevelled portions of these modular construction units merge into the hullside walls 11. In the embodiments according to FIGS. 2, 3, 4, 6, 7, and 9 or 12, the hollow modular construction units 13 and 14 in the bottom 9 and units 13 in the region of the top deck 10 are all arranged with their wider sides running horizontally. It may, however, be convenient to arrange the modular construction units 13 with their wider sides arranged vertically in the region of the top deck 10, as shown in FIGS. 5 and 11.

It may also be advantageous as will be explained further below that in the embodiment shown in FIGS. 5 or 11, two additional hollow modular construction units 13 be provided which extend centrally and in the longitudinal direction of the top deck 10.

Figure 8:
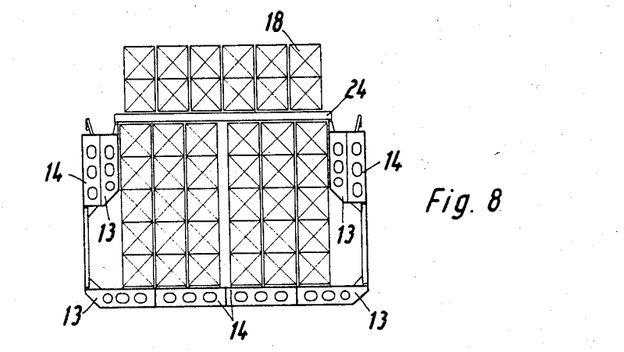
FIGURE 8 is an end view and a loading plan of a modulus for container cargo utilizing additional modular units arranged somewhat differently from FIGURE 5.

A further constructional example as regards the arrangement of the units 13 and 14 provided according to the invention is shown in FIG. 8, wherein, instead of the two units 13 in the region of the top deck in the midship section, a pair of units 13 and 14 with their wider sides running vertically in the region of the top deck 10 are united to form a complete unit, one of which is arranged on each side of the ship's hull and forms a part of the hull wall on such side.

Figure 8A:
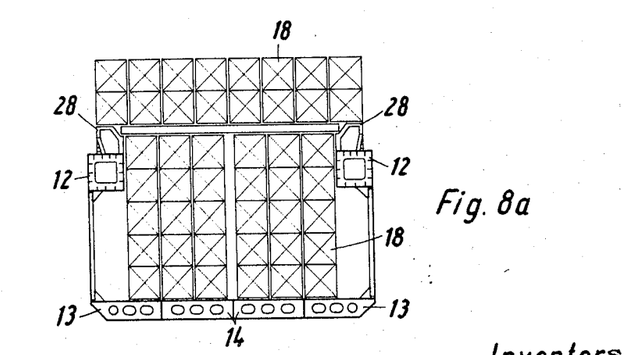
FIGURE 8a is an end view of a modulus showing a loading plan for container cargo utilizing modified forms of hollow modular units in top deck regions of the modulus.

FIG. 8a finally shows how units 12 in lieu of units 13 or 14 may be arranged in the region of the deck 10 and may also have a square section and be provided with a deck superstructure 28 (see FIG. 8a) which includes a coaming for receiving the hatch cover 24 in a flush manner and serves as a support for containers 18 forming a deck load.

Considered overall, the selection and constructional arrangement of the hollow modular construction units 12, 13, 14 in the region of the top deck 10 to form respective prefabricated moduli 2, 3 and 5, for example, depends mainly on the type of cargo for which the ship is to be used. In FIGS. 2, 9 or 11 and 12, this cargo consists of the so-called containers 18, general cargo 19 as well as motor vehicles 21, whereas in FIGS. 3 and 6, the cargo consists of bulk products 22.

The major dimensions of the hollow modular construction units 12, 13 and 14 and their favorable arrangement in the neutral zones permits the ship's frame, apart from the bulkheads to be constructed without transverse stiffening. Thereby, the usable load space, in particular the ratio of cargo volumes available for general cargo in comparison with the cargo space available for bulk cargo is higher than with usual motor ships as is indicated in an impressive way by inspection of FIGS. 2 to 9 and also FIGS. 11 and 12.

By the possibility of providing a given cargo capacity in a smaller overall length owing to the possible greatly increased draught the vessel can in some cases be provided with one less bulkhead than a conventional ship for the same cargo capacity. In this way, the number of cargo spaces for a given quantity of cargo is reduced.

The division of the cargo spaces is defined by the double bulkheads 7 and the engine room and collision bulkheads normaly provided but not shown on the drawings. The double bulkheads 7 are provided at their top with a box frame, not shown, for transmitting the forces and torque which are encountered. The double bulkheads 7 may additionaly be adapted to receive ballast and, moreover, serve for receiving the cargo space ventilation equipment. Moreover, the double bulkheads 7 have externally a completely smooth surface since all stiffening members lie within them.

Figure 6:
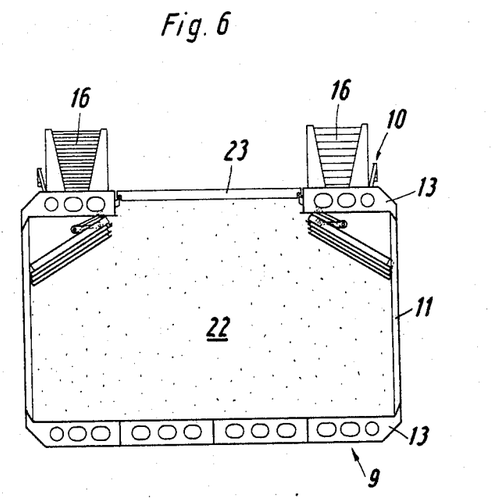
FIGURE 6 shows a view and loading plan like that of FIGURE 3 for bulk cargo on a larger scale.
Figure 7:
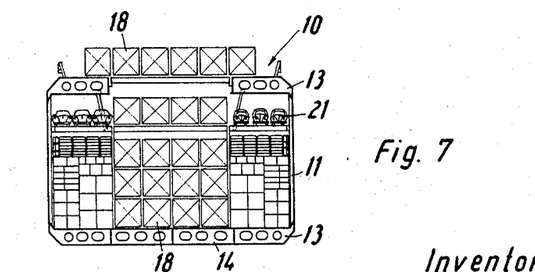
FIGURE 7 is a view and loading plan similar to that of FIGURE 2 adapted for a combination of container cargo, automobile cargo and general cargo.

In use, as a general cargo vessel, the ship is provided with a suspended deck 15 carried by modular construction units 13, for example, which when folded downwardly serves as a complete intermediate deck in conjunction with false deck members 16 in the region of the hatches (see FIGS. 4 and 12). When the vessel is to be used for bulk cargo the false decks 16 are removed and the suspended deck 15 raised by means of a swing device 17 and locked to the units 13, as shown in FIGS. 3 and 6. In this position, the false deck 15 provides the ship with the properties of self-triming for bulk cargo loading. If further false decks are to be provided as shown in FIG. 9, these can be folded against the suspended deck 15 after the latter is locked in raised position and fastened to it so that likewise in this case a complete loading cross-section is available for use as a self-trimming bulk cargo carrier.

By the particular arangement of the units 12, 13, 14 provided in the region of the top deck 10, it is moreover possible to reduce the so-called dead space to a minimum, particularly when, for loading with general cargo 19 or containers 18, as shown in FIGS. 2, 4, 7, 9 and 12, the said false decks 15 are used. The bulk material inserted into the cargo space is indicated at 22 in FIGS. 3 and 6 and loaded motor vehicles as shown at 21 in FIGS. 7 and 9.

The arrangement of the modular construction units 12, 13, 14 provided in the region of the top deck 10 is of particular advantage since the units being hollow can receive large amounts of water ballast when in ballast which ensures satisfactory seagoing behavior under these conditions.

Of particular significance is the fact that these hollow units provide a new way for arranging the hatches which represents a considerable technical advantage which will now be described.

As will be seen particularly from FIGS. 10 and 11, the hatch opening 25 (FIG. 10) is defined laterally in the length direction of the ship by the modular construction units 13 and transversely by the double bulkheads 7 already referred to or by top box frame members, not shown, and in some cases also by the engine room front bulkhead and the collision bulkhead. The vessel thus has an almost completely continuous loading and unloading hatch opening when used as a general dry cargo ship or as a normal bulk cargo vessel. With the arrangement of the units 13, 14 as lateral deck supports (see FIGS. 2, 3, 4, 6, 7, 9, 10 and 12), the hatch opening 25 is closed by the hatch covers 23. The latter are located in the region of the double bulkhead 7 and divide the cargo spaces in a liquid-tight manner one from the other.

In the arrangement according to FIGS. 5 and 11, there is provided a so-called open ship which embodies two parallel hatch openings 27 and 29 running lengthwise of the vessel which permit a maximum number of containers 18 to be loaded on guide rails, not shown, with the smallest possible dead space.

As shown in FIG. 11, the hatch openings 27 and 29 are defined relative to the center axis by means of two additional centrally arranged modular construction units 13 arranged with long faces vertical and with their top surfaces flush with the two side-by-side hatch covers 23. This arrangement is particularly convenient in the case of a container ship. Alternatively, the two intermediately positioned units 13 may be spaced from one another (not shown), thus dividing the cargo space into three separate areas and in these cases, the two central units 13 in FIG. 11 or the spaced units 13 which may be provided as an alternative serve as guide frames for the containers forming the cargo load.

As will be seen particularly from FIGS. 10 and 11, it is possible to arrange the hatch construction within the constructional height of the modular construction units due to the arrangement of these units 13, 14 so that the upper deck 10 comprises a completely flat surface without camber and without floor rise, and omitting all projecting hatch coamings extending above the plane of the top deck 10 which are otherwise necessary, thus leaving the deck surface completely clear for deck loading and, moreover, with a corresponding size and shape of the hatch covers 23, it is possible to operate with a deck load over the whole of the top deck region (see FIGS. 2, 5, 7, 8a and 11). The necessary degree of safety when loading and unloading can be obtained when the hatch opening 25 is flush with the top deck 10, for example, by the fact that locking or unlocking of the hatch cover 23 is only possible after erection of a guard rail 30 (FIG. 10).

This guard rail reliably ensures that seamen and others on deck cannot fall into the open hatch opening 25. This guard rail is so constructed that when the hatch is closed, the guard rail lies collapsed between the cover 23 and the deck 10.

On releasing and lifting the hatch cover 23, the raising of the guard rail 30 can be effected mechanically and automatically so that the positioning of the guard rail in protective disposition occurs in every case before the hatch is opened.

It will be seen that to satisfy a demand for a given carrying capacity of the ship, for example, only the prefabricated mid-ship modulus need be made correspondingly larger or longer for which no particular constructional difficulties are involved. The intermediate prefabricated moduli are then attached to this elongated mid-ship.

As a result of the exchangeability of the prefabricated moduli, that is to say, the mid-ship modulus and the intermediate moduli and by using hollow modular construction units, it becomes possible not only to provide a rational production of the hull but it is now possible to carry out rapidly any repairs which may be necessary to the hull structure.

While specific embodiments of the invention have been described and shown, variations in structural detail are possible and are contemplated. There is no intention, therefore, of limitation to the exact abstract or disclosure hereinabove presented.

What is claimed is:

1. A method of constructing a cargo ship hull for carrying selected types of bulk, general and container cargoes according to desired needs of shipowners comprising the steps of providing basic hollow modular construction units of different types, prefabricating groups of such units into selected types of cargo carrying moduli, then selecting required of such moduli to meet shipowner's cargo carrying requirements, arranging the selected prefabricated assembled moduli into fore and aft, mid and intermediate positions and joining the so-arranged moduli together to form the desired hull.

2. A cargo ship hull for selectively carrying general, bulk and container cargoes as required comprising a plurality of assembled individual prefabricated moduli interchangeably joined together, said moduli being respectively capable of carrying different selected of such cargoes and including forward, aft and mid-ship prefabricated modul and intermediate prefabricated moduli between each mid ship modulus and the forward and aft moduli of said hul in selected number, said prefabricated moduli each com prising similar basic hollow modular construction unit assembled and joined together to form moduli and serv respectively different selected cargo-carrying requirement: said moduli forming mainly the hull of a ship whos joined moduli have respective selected cargo-carryin properties and which moduli are selectively variable du ing construction of the hull to accommodate differei desired and selected cargo loads in the completed hu] some of said hollow modular construction units of eac modulus forming respectively the ship's bottom and its tc deck and being generally rectangular in shape, hull sic plates joined to some of said hollow modular constru tion units, the latter units forming part of the hull and al being bevelled at their junctions with said hull side plat( 3. A cargo ship hull according to claim 2, wherein sa hollow construction units are generally of oblong a rectangular shape disposed and joined to form respectiv« the ship's bottom and its top deck, all said units bei disposed with their wider faces running horizontally.

4. A cargo ship hull for carrying general, bulk and container cargoes as required comprising a plurality of assembled prefabricated moduli joined together, said moduli being respectively capable of carrying selected of such cargoes and being interchangeable, said prefabricated moduli each comprising joined assemblies of hollow modular construction units, said moduli comprising forward, aft, mid-ship and intermediate moduli, said hollow modular construction units of each modulus forming respectively the ship's bottom and its top deck and being generally of oblong and rectangular shape disposed and joined to form the ship's bottom and its top deck, those of said units forming the ship's bottom being disposed with their wider faces running horizontally and those of said units forming the ship's deck being disposed with their wider faces running vertically.

5. A cargo ship hull according to claim 4, including a pair of additional hollow construction units extending in the longitudinal direction of and lying centrally disposed in the region of the top deck and whose wider faces run vertically.

6. A cargo ship hull according to claim 4, including a pair of additional spaced apart of said hollow modular construction units in the region of the top deck.

7. A cargo ship hull according to claim 4 including in addition to the hollow construction units forming the top deck additional hollow construction units connected thereto.

8. A cargo ship hull according to claim 2, wherein those of the hollow construction units forming the top deck define lengthwise of the ship the boundaries of a hatch opening which extends over substantially the entire length of the top deck.

9. A cargo ship hull according to claim 5, wherein the hollow construction units in the region of the top deck define lengthwise of the ship boundaries of a pair of side-by-side hatch openings.

10. A cargo ship hull according to claim 2, wherein said hollow construction units are all of similar generally rectangular shape.

References Cited
UNITED STATES PATENTS

| | | | |
|---|---|---|---|
| 855,154 | 5/1907 | Babcock | 114—65 |
| 2,368,441 | 1/1945 | Bedford | 114—65 |
| 2,369,265 | 2/1945 | Thiel | 114—77 |
| 2,399,202 | 4/1946 | Byrne | 114—77 |

TRYGVE M. BLIX, *Primary Examiner.*

U.S. Cl. X.R.

114—65, 73